United States Patent
Blomquist

(10) Patent No.: US 6,195,996 B1
(45) Date of Patent: Mar. 6, 2001

(54) BODY OF GAS GENERATING MATERIAL FOR A VEHICLE OCCUPANT RESTRAINT

(75) Inventor: Harold R. Blomquist, Gilbert, AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/469,055

(22) Filed: Dec. 21, 1999

(51) Int. Cl.[7] ........................................ F01B 29/08
(52) U.S. Cl. ............................................... 60/632
(58) Field of Search .............................. 60/632, 634, 637

(56) References Cited

U.S. PATENT DOCUMENTS

| | | |
|---|---|---|
| 660,568 | 10/1900 | Gathmann . |
| 3,262,265 * | 7/1966 | Waecker et al. .................. 60/632 X |
| 3,723,205 | 3/1973 | Scheffee . |
| 5,349,892 | 9/1994 | Taylor et al. . |
| 5,585,596 * | 12/1996 | Richards et al. .................. 60/632 X |
| 5,671,949 | 9/1997 | Bauer et al. . |
| 5,892,172 | 4/1999 | Candland et al. . |

* cited by examiner

Primary Examiner—Hoang Nguyen
(74) Attorney, Agent, or Firm—Tarolli, Sundheim, Covell, Tummino & Szabo L.L.P.

(57) ABSTRACT

A body (12) of gas generating material for use in a gas generator (66) comprises an elastic matrix, and an outer periphery (14). At least one kerf (18) extends from the outer periphery (14) partially through the body (18) of gas generating material. The kerf (18) has an essentially closed configuration.

26 Claims, 5 Drawing Sheets

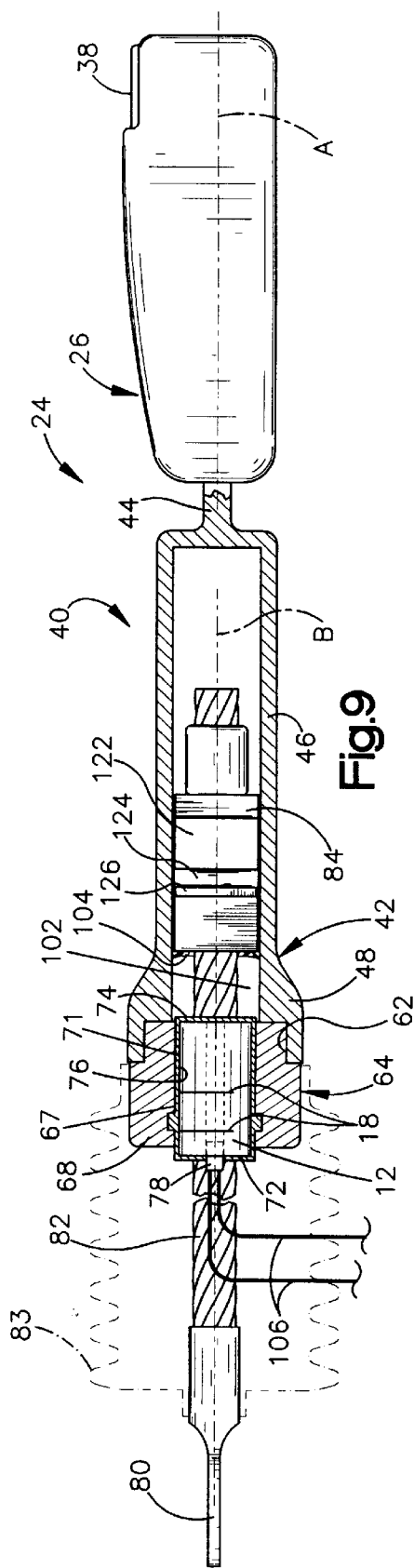
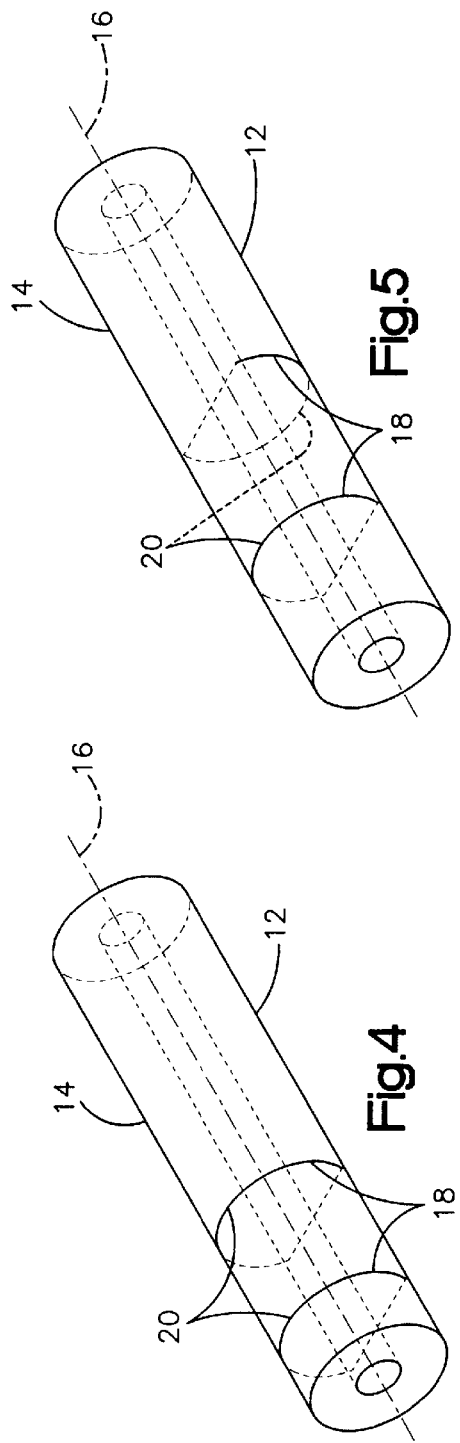

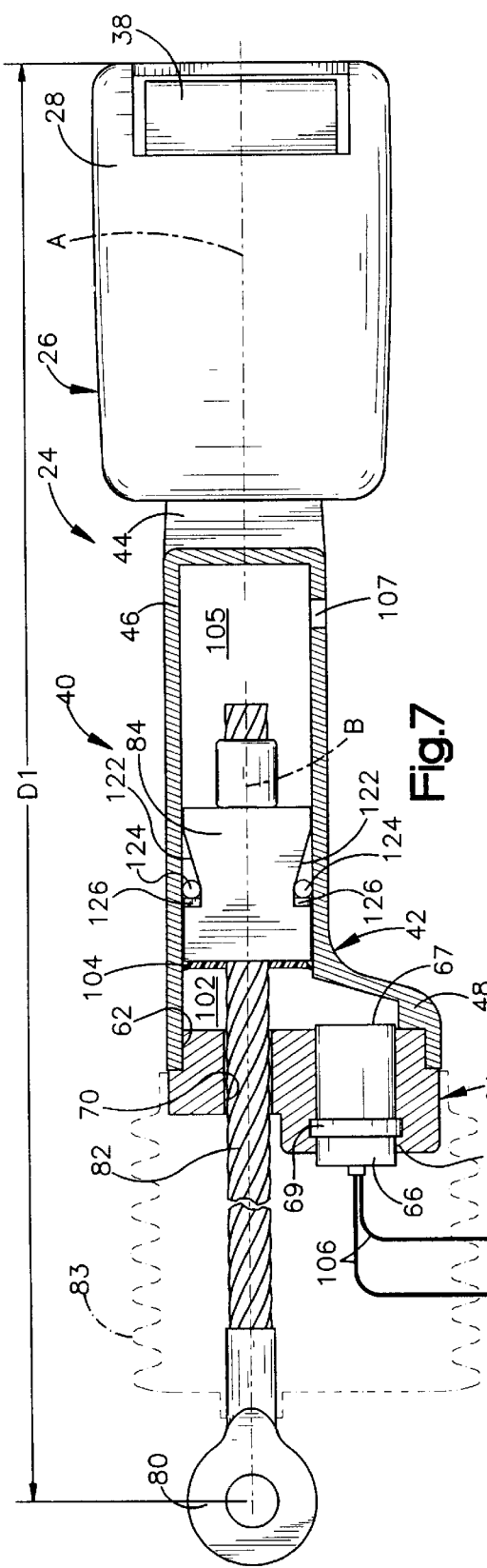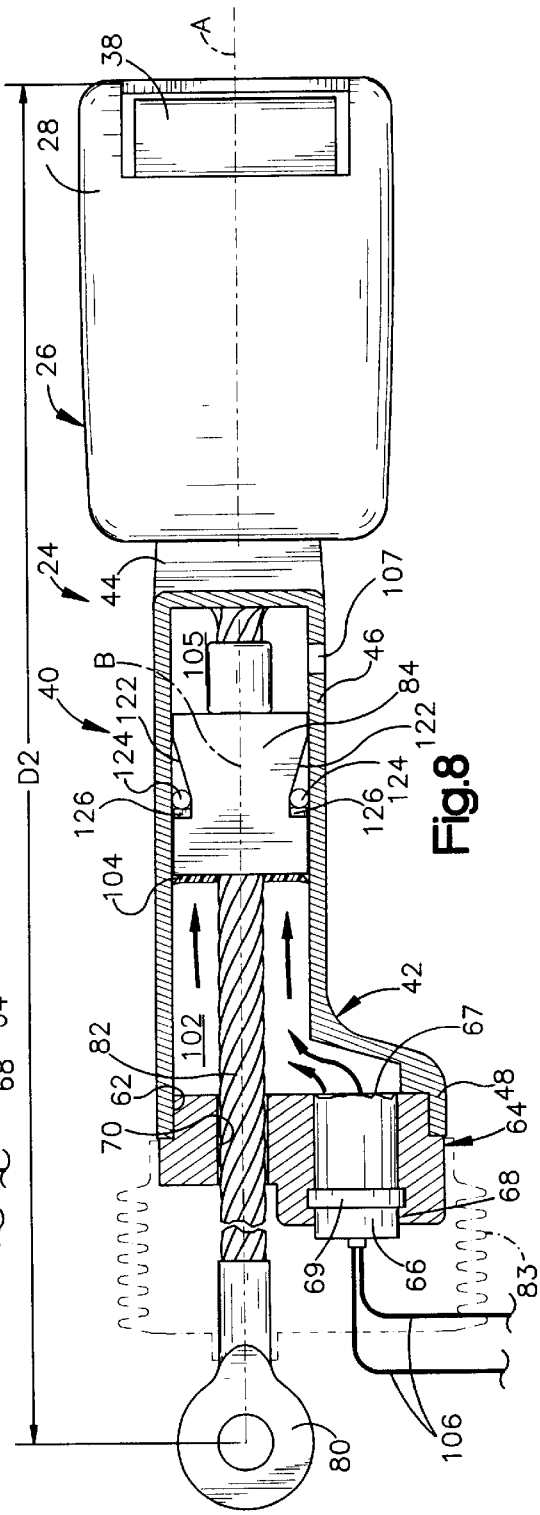

BODY OF GAS GENERATING MATERIAL FOR A VEHICLE OCCUPANT RESTRAINT

FIELD OF THE INVENTION

The present invention relates to an apparatus for restraining a vehicle occupant in the event of a collision, and particularly relates to a body of gas generating material for a vehicle occupant restraint. One type of restraint apparatus for which the body of gas generating material is particularly useful is a seatbelt pretensioner.

BACKGROUND OF THE INVENTION

Gas generating materials for vehicle occupant restraints are well known. A common gas generating material comprises a thermoplastic polymeric fuel, a plasticizer for the fuel, and a finely divided particulate oxidizer. Examples of polymeric fuels are polyvinyl chloride, polyester elastomers, polyurethane elastomers, and copolymers thereof. Examples of suitable plasticizers are alkyl and alkoxy adipates, sebacates, and phthalates. Examples of suitable oxidizers are inorganic oxidizers such as ammonium, alkali metal and alkaline earth metal chlorates, perchlorates, and nitrates.

A gas generating material suitable for use in certain vehicle occupant restraints must burn fast enough to actuate the restraint, but its combustion cannot be explosive, as provided by a gun propellant.

The gas generating material is used by placing the gas generating material in a combustion chamber of a restraint apparatus. One physical form used for a gas generating material is a molded or an extruded shape, frequently in the shape of a rod. The components of the gas generating material are introduced into a forming apparatus such as a mold or an extruder. A solvent or heat may be used to facilitate mixing and extrusion. The mold or extruder produces a rod of the gas generating material which, following extrusion, is cut into suitable lengths for positioning in the combustion chamber of a restraint apparatus.

U.S. Pat. No. 660,568 discloses grooves in a rod of gas generating material to improve the burning characteristics of the gas generating material. The subject matter of this patent is a nitrocellulose based propellant for use in ordnance, and the grooves are intended to give ample vent to the gases formed on combustion of the gun propellant.

An example of an apparatus for restraining a vehicle occupant in the event of a collision is a seat belt associated with a seat belt pretensioner. The pretensioner can be actuated by a gas provided by a gas generator. The gas generator contains a body of gas generating material. The gas generator includes an igniter. The igniter is actuated to ignite the gas generating material when the vehicle experiences a collision for which pretensioning of the seat belt is desired. As the gas generating material combusts, it generates a volume of gas. The gas is directed against a mechanism, e.g. a piston, connected to a cable. The seat belt is then tightened against the vehicle occupant.

SUMMARY OF THE INVENTION

The present invention is a body of generating material for use in a gas generator. The body of gas generating material produces upon ignition combustion products. The body of gas generating material comprises an elastic matrix and an outer periphery. At least one kerf extends from the outer periphery partially through the body of gas generating material. The kerf has an essentially closed configuration.

BRIEF DESCRIPTION OF THE DRAWINGS

The foregoing and other features of the present invention will become apparent to one skilled in the art upon consideration of the following description of the invention with reference to the accompanying drawings in which:

FIG. 4 is a schematic view of the body of gas generating material which has been kerfed according to one embodiment of the present invention;

FIG. 5 is schematic view of the body of gas generating material which has been kerfed according to another embodiment of the present invention;

FIG. 7 is a sectional view of the buckle assembly of FIG. 6;

FIG. 8 is a view similar to FIG. 7 with parts illustrated in different positions;

FIG. 9 is a sectional view of the buckle assembly of FIG. 7; and

DESCRIPTION OF A PREFERRED EMBODIMENT

Figure 1:
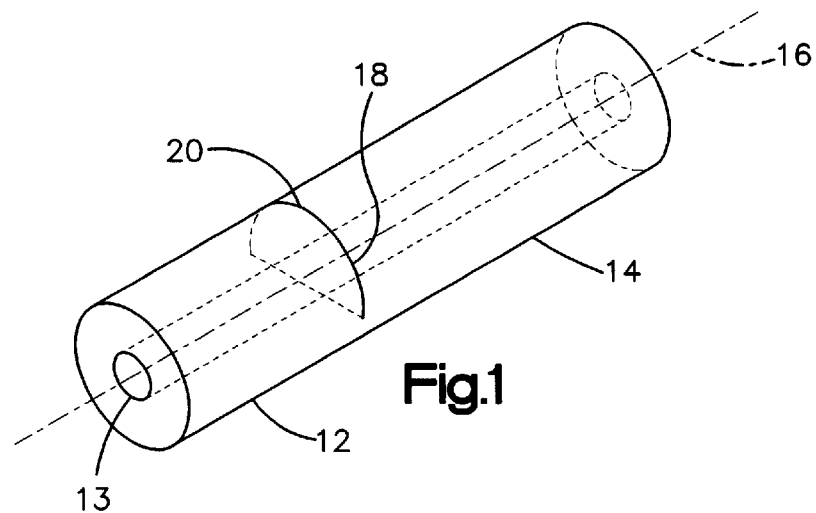
FIG. 1 is a schematic perspective view of a body of gas generating material in accordance with the present invention.
Figure 2:
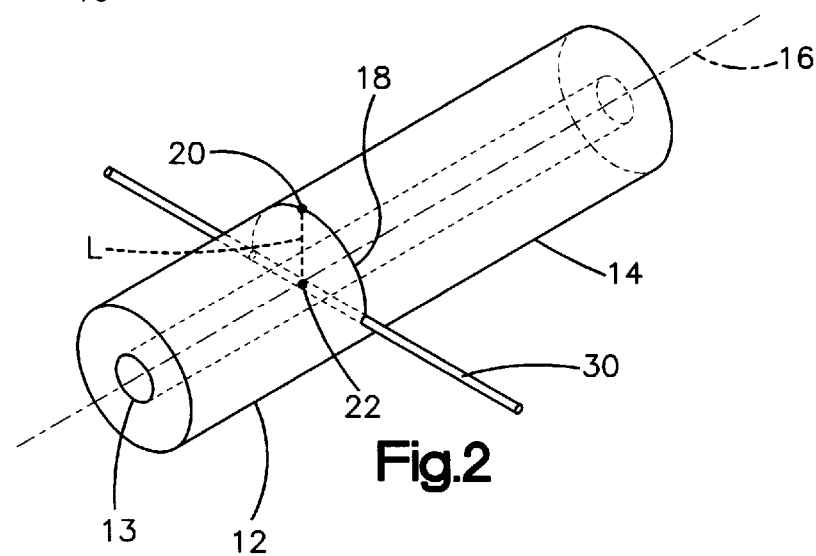
FIG. 2 is a schematic view of the body of gas generating material of FIG. 1 showing the formation of a kerf in accordance with the present invention.
Figure 3:
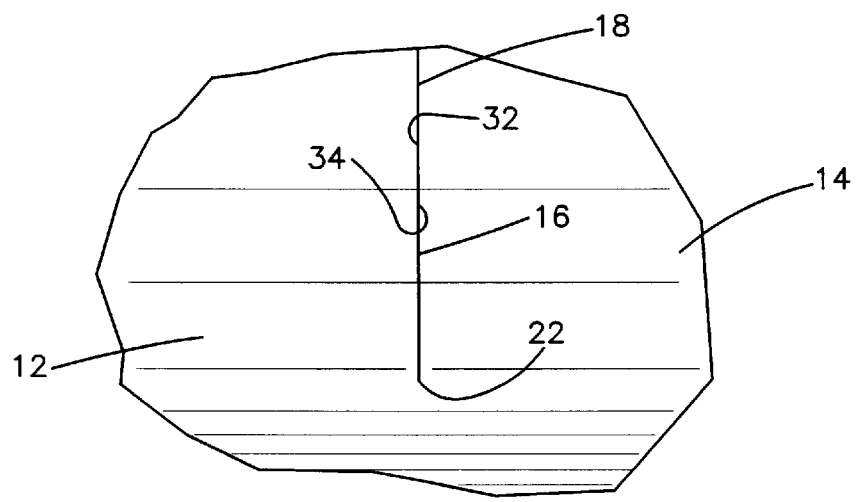
FIG. 3 is an enlarged, schematic, partial, elevational view of the body of gas generating material of FIG. 1, viewed from the side of FIG. 1.

Referring to FIGS. 1, 2, and 3, a body 12 of gas generating material has an outer periphery 14 defining a volume and a longitudinal central axis 16. Preferably, the body 12 of gas generating material has the shape of a cylindrical rod. The body 12 of gas generating material could have other shapes such as rectangular or trapezoidal, all of which are known in the art. The body 12 of gas generating material may contain area—increasing features such as an axially extending passage 13 or a slot (not shown). The passage 13 or slot increases the burn surface area of the body 12 of gas generating material and enhances the flow of combustion products away from the body 12 of gas generating material.

The body 12 of gas generating material has at least one kerf 18 extending from the outer periphery 14 of the body 12 of gas generating material partially through the body 12 of gas generating material. By kerf, it is meant a cut in the gas generating material. The kerf 18 extends transverse to the longitudinal central axis 16. The kerf 18 is centered about a straight line L which extends perpendicular to and intersects the central axis 16. The line L also extends from a point 20 on the outer periphery 14 of the body 12 of gas generating material to a point 22 (FIG. 3) located past the longitudinal central axis 16 on a side of the central axis 16 opposite the side where the point 20 is located. The line L extends through points 20 and 22. More specifically, the kerf 18 preferably intersects the periphery 14 by more than 180°.

The kerf 18 is made by drawing a piano wire 30 (FIG. 2) partially through the outer periphery 14 and the body 12 of gas generating material. By piano wire, it is meant a metal wire (e.g. a high carbon steel wire), which has a diameter less than about 0.1 inch and, preferably, about 0.001 inch to about 0.07 inch.

As the piano wire 30 passes through the body 12 of gas generating material, the piano wire 30 forms two parallel planar surfaces 32 and 34 (FIG. 3) within the body 12 of gas generating material. The piano wire cut, as opposed to a cut made by a knife or a saw removes essentially no gas generating material.

The gas generating material of the body 12 comprises a polymeric matrix having elasticity. The elasticity of the body 12 of gas generating material is such (as will be disclosed) that when the piano wire 30 is removed from the body 12 of gas generating material, the body 12 of gas generating material relaxes and the kerf 18 adopts an essentially closed configuration with the surfaces 32 and 34 contiguous to one another. As shown in the partial, elevational view of FIG. 3, the first and second surfaces 32 and 34, are in contact with each other along substantially the entire depth of the kerf 18.

A kerf formed in this manner increases the mass generation rate of gas per unit of time (liters/second), during combustion, of the body of gas generating material. Conventionally, a rod-shaped body of gas generating material is ignited at one end of the body essentially at the body axis. The flame front initially spreads across the outer surface of the body of gas generating material, and then burns inwardly from the outer surface, into the interior of the body. If the body of gas generating material comprises features that increase its surface area such as passages or slots, the flame will also spread along such passages or slots and then inwardly from exposed surfaces of the perforations or slots into the interior of the body of gas generating material.

In the present invention, the flame travels inwardly into the body 12 of gas generating material along the kerf 18 formed in the body 12 of gas generating material. The rate of propagation of the flame front into the interior of the body 12 of gas generating material along a kerf 18 has been found to be substantially greater than the normal rate of propagation of the flame front from an outer surface into the interior of a body of gas generating material. Similarly, the rate of propagation of the flame front along a kerf has been found to be substantially greater than the normal rate of propagation of the flame front from surfaces of surface adding features such as passages or slots. Thus, the mass generation rate of gas per unit of time (liters/second) is increased.

A plurality of kerfs 18 can be provided in the body 12 of gas generating material, as shown in FIGS. 4 and 5, by successively drawing the piano wire 30 partially through the body 12 of gas generating material at points 20 on the outer periphery 14 which are spaced apart longitudinally along the axis 16. Preferably the kerfs 18 are non-intersecting and in parallel planes to one another. The plurality of kerfs 18 can be provided in various arrangements along the longitudinal central axis 16 of the gas generating material. In one arrangement, as depicted in FIG. 4, the kerfs 18 extend from points 20 on the outer periphery 14 located on the same side of the body 12 of gas generating material. In another arrangement, as depicted in FIG. 5, the kerfs 18 extend from successive points 20 on the outer periphery 14 that are on opposite sides of the central longitudinal axis 16. Also, the kerfs 18 can be of various extents into the body 12 of gas generating material and of various angular extents around the periphery of the body 12 of gas generating material.

The mass generation rate of gas per unit of time (liters/second), during combustion of the body 12 of gas generating material, is dependent on the number of kerfs 18 and the area of the kerfs in the body of gas generating material. The mass generation rate of gas per unit of time increases as the number and/or area of kerfs 18 in the body of gas generating material increases. As such, the number of kerfs 18 in the body 12 of gas generating material can be varied to tailor mass generation rate per unit time of the body 12 of gas generating material to whatever is desired. There is no specific upper limit to the number of kerfs 18 used. The limit depends only on the mechanical properties, such as stiffness, required of the body 12 of gas generating material.

The body 12 of gas generating material comprises a plasticized thermoplastic polymer fuel. An example of a thermoplastic polymer fuel is polyvinyl chloride. The term polyvinyl chloride includes both the homopolymer and copolymers of polyvinyl chloride. Other thermoplastic polymer fuels which can be used in the present invention include polyester elastomers, polyether elastomers, polyurethanes, and copolymers thereof. Preferably, the thermoplastic polymer fuel is in the form of plastisol grade spheroid particles.

A plastisol forming organic liquid plasticizer compatible with the thermoplastic polymer fuel is employed to plasticize the thermoplastic polymer fuel. Such plasticizers are well known in the art. Preferably the plasticizer is of the type suitable for plastisol formation, such as alkyl and alkoxy adipates, sebacates, phthalates (i.e. dibutyl and dioctyl sebacates, dibutyl, dioctyl, and dimethoxyethyl phthalate, and dibutyl, dioctyl, and di(3,5,5-trimethylhexyl) adipate) and esters of fatty acids. These plasticizers are high boiling point solvents which form a fluid suspension with the thermoplastic polymer fuel at low temperatures and solid gels with the thermoplastic polymer fuel at high temperatures.

The weight ratio of thermoplastic polymer fuel to plasticizer can be adjusted to control the physical properties (i.e. tensile strength and elasticity) of the body of gas generating material. A preferred weight ratio of thermoplastic polymer fuel to plasticizer is generally from about 1:3 to about 3:1. At these weight ratios, the thermoplastic polymer fuel and plasticizer form an elastic matrix that can accommodate up to 90% by weight of added solids.

A finely divided particulate oxidizer is dispersed within the plasticized thermoplastic polymer fuel. The finely divided oxidizer can be any oxidizer commonly used in gas generating materials. Preferably, the oxidizer is an inorganic compound that contains oxygen and readily combusts with the thermoplastic fuel. Examples of inorganic oxidizers include inorganic oxidizing salts such as ammonium, alkali metal, and alkaline earth metal chlorates, perchlorates, and nitrates, as well as metal oxides and metal peroxides. These inorganic oxidizers are insoluble in the fuel or plasticizer and remain uniformly dispersed in the fuel/plasticizer matrix during processing of the gas generating material.

If the polymer fuel is polyvinyl chloride, the inorganic oxidizer may be a mixture of a chlorate or a perchlorate, and a halogen free alkali metal or alkaline earth metal salt. The halogen free alkali metal or alkaline earth metal salts react, upon combustion, with the halogens in the chlorate or perchlorate oxidizer and the thermoplastic polymer fuel to form a non-toxic alkali metal or alkaline earth metal combustion product. Preferred alkali metal or alkaline earth metal salts are the alkali metal and alkaline earth metal nitrates such as potassium nitrate ($KNO_3$), sodium nitrate ($NaNO_3$), barium nitrate ($Ba(NO_3)_2$), and strontium nitrate ($Sr(NO_3)_2$). Alkali metal and alkaline earth metal salts have the advantage of forming nitrogen gas as a combustion product and increasing the burn rate and pressure exponent of the gas generating material.

Halogen free alkali metal or alkaline earth metal salts which do not react as oxidizers can be mixed with the inorganic oxidizer. These salts form non-toxic gas products that increase the gas production, decrease the concentration of solid combustion products, and act as coolants. Examples of non-oxidizer salts include alkali metal and alkaline earth metal oxalates, carbonates, bicarbonates, and azides.

The amount of oxidizer dispersed in the plasticized thermoplastic polymer fuel is that amount necessary to sustain combustion of the plasticized thermoplastic fuel. Preferably, the amount of oxidizer is that amount of oxidizer sufficient to oxidize the carbon and the hydrogen in the plasticized thermoplastic fuel to carbon dioxide and water.

The body of gas generating may be formed by mixing, in a conventional mixer, particles of the thermoplastic polymer fuel, the liquid plasticizer, and finely divided particles of the oxidizer. The viscous yet still fluid mixture may be poured into a prefabricated mold having the shape of the body of gas generating material. The mold and the mixture are then heated to the fusion temperature of the thermoplastic polymer fuel. The body of gas generating material is cooled, and the mold is removed.

Alternatively, the mixture of thermoplastic polymer fuel, plasticizer, and oxidizer may be poured into a heated-jacket worm extruder and cured by continuous passage through the heated extruder passage. The cured mixture is advanced through a shaping device or die with a predetermined diameter, cut to desired length, and cooled. Alternatively, mixing can take place in the extruder.

The body of gas generating material formed by molding or extrusion has an elastic matrix of plasticized thermoplastic fuel with particles of oxidizer dispersed within the elastic matrix. The elastic matrix allows the body of gas generating material to recover to essentially its original shape upon deformation caused by formation of the kerfs 18 of the present invention.

Figure 6:
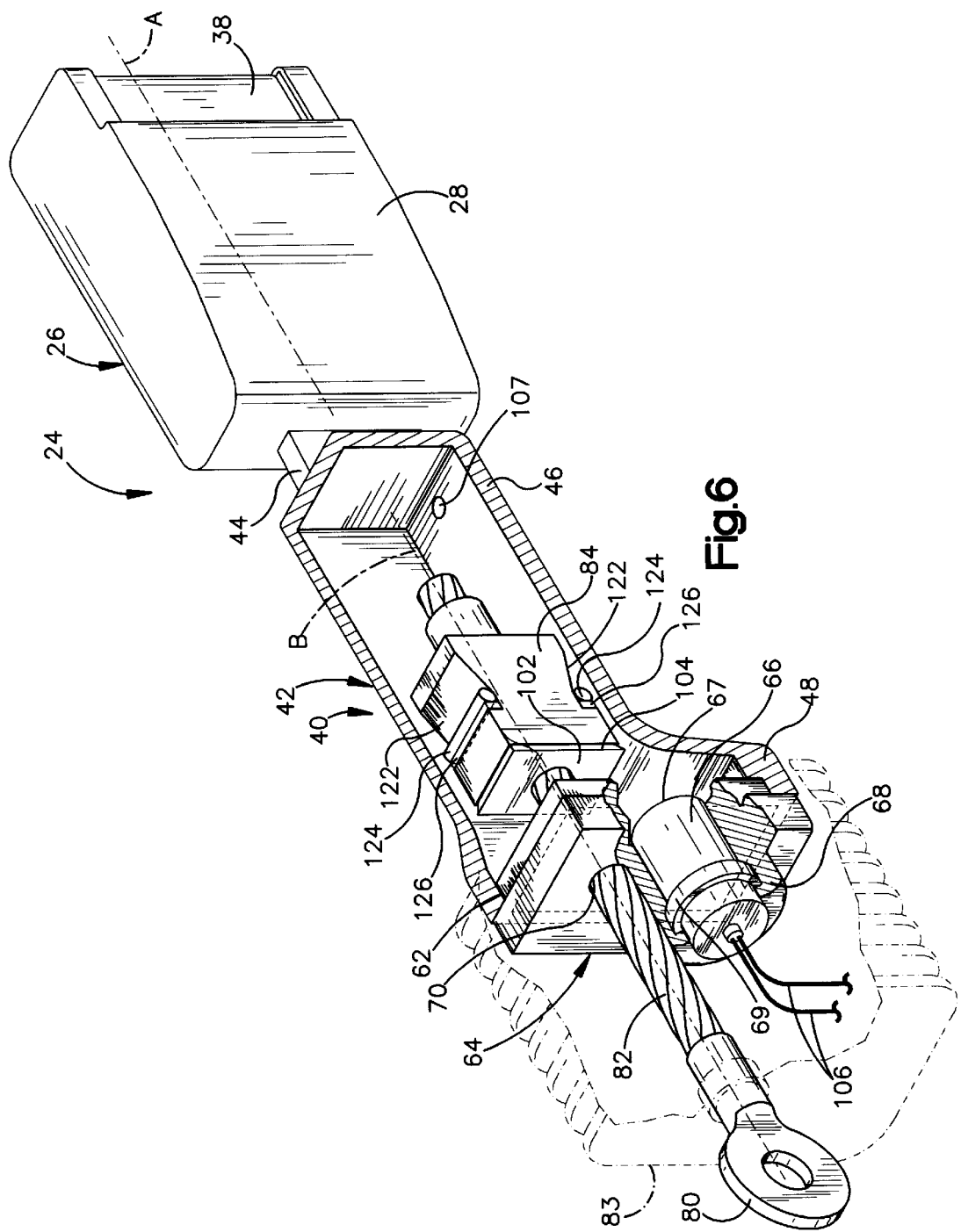
FIG. 6 is a schematic view of a buckle assembly for a vehicle safety belt system including a pretensioner according to an embodiment of the present invention.
Figure 10:
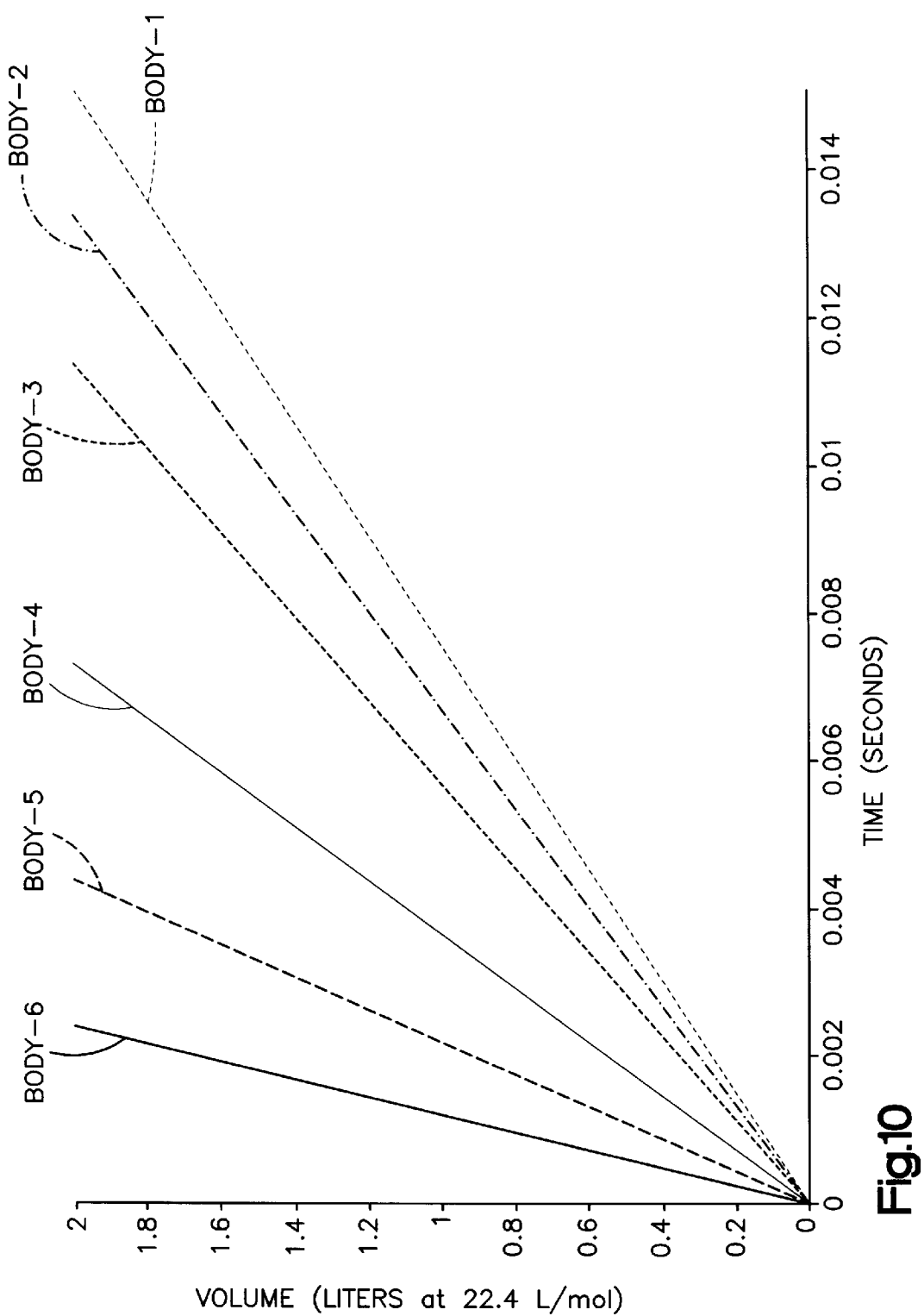
FIG. 10 is a plot showing the volume of gas produced against time for the combustion of bodies of gas generating material prepared in accordance with the present invention.

The body 12 of gas generating material may be, by way of example, utilized in a vehicle occupant seat belt system. A vehicle occupant seat belt system includes a buckle assembly 24 (FIG. 6) and seat belt webbing (not shown). The buckle assembly 24 is attached to a component of the vehicle, such as a seat, floor or door pillar (not shown). The seat belt webbing is extendable about an occupant of a vehicle seat. The seat belt webbing carries a tongue (not shown), which is connectable with the buckle assembly 24 to secure the seat belt webbing about the occupant.

The buckle assembly 24 includes a buckle 26 having a cover 28, a moveable push button 38 extending through the cover, and a longitudinal axis A. The buckle 26 receives and latches the tongue to connect together the seat belt webbing and the buckle assembly 24. The buckle 26 is actuatable to release the tongue when the push button 38 is manually depressed.

The buckle assembly 24 includes a pretensioner 40. The pretensioner 40 is operatively connected with the buckle 26. The pretensioner 40 is automatically actuatable to tension the seat belt and tighten the seat belt against the occupant in response to a vehicle collision that requires tensioning of the seat belt and tightening of the seat belt against the occupant.

The pretensioner 40 includes a hollow housing 42 (FIGS. 6–9), which is fixed to the buckle 26 by a connector 44. The connector 44 may be of any suitable length and extends in a direction substantially parallel to the axis A of the buckle 26. The housing 42 and the connector 44 are preferably made as one piece of metal, such as by die casting. The housing 42 has a longitudinal axis B, which is substantially coaxial with the axis A of the buckle 22. The housing 42 includes a tube portion 46, which has a rectangular inner periphery in a plane extending normal to the axis B.

The housing 42 also includes an enlarged end portion 48 extending from the tube portion 46. The tube portion 46 is in fluid communication with the enlarged end portion 48. The enlarged end portion 48 has an opening 62 to the left, as viewed in FIGS. 7–9. A first end wall or cap 64 is fixed in the opening 62 of the enlarged end portion 48 by suitable means, such as a weld or an adhesive. The cap 64 is preferably made from metal. A circular opening 70 extends through the end cap 64 around the axis B of the housing 42.

A gas generator 66 is supported by the end cap 64. The gas generator 66 includes a casing 67. The casing 67 has a generally cylindrical configuration including an axially extending side wall 71 (FIG. 9), first and second radially extending end walls 72 and 74 disposed at opposite ends of the side wall 71, and an annular flange 69 (FIG. 7) projecting radially from the side wall 71. An end portion 68 of the cap 64 is deformed over the flange 69 of the gas generator 66 to retain the gas generator in the cap. The side wall 71 and the end walls 72 and 74 of the casing 67 define a combustion chamber 76 within the casing. The body 12 of gas generating material is loaded in the combustion chamber 76. The body 12 of gas generating material occupies a substantial portion of combustion chamber 76.

The second radially extending end wall 74 supports an igniter 78. The igniter 78 contains an ignitable material (not shown). Electric leads 106 convey a current to the igniter to ignite the ignitable material. The current is provided when a crash sensor (not shown), which is responsive to a condition indicative of a vehicle collision, closes an electrical circuit (not shown) that includes a power source (not shown).

An anchor 80 is secured to the component of the vehicle by a suitable fastener such as a bolt. A connector or cable 82 is fixed at one end to the anchor 80. The cable 82 is substantially inextendable in a direction along its length. The cable 82 extends through the opening 70 in the cap 64. The outer diameter of the cable 82 fits tightly in the opening 70, and the cable forms a seal against the surface of the cap 64 defining the opening 70. It will be appreciated that a resilient seal could be provided in or at the opening 70 to engage the exterior of the cable 82. A bellows 83 is provided at the enlarged end portion 48 of the housing 42 to inhibit access to the cable 82, the igniter 66, and the enlarged end of the housing. The buckle 22 is initially spaced from the anchor 80 a distance D1 prior to actuation of the pretensioner 40.

An end of the cable 82 opposite the end connected to the anchor 80 is connected to a second end wall or piston 84. The piston 84 has a rectangular outer periphery, in plane extending normal to the axis B of the housing 42, and closely fits within the tube portion 46 of the housing. The piston 84 cooperates with the housing 42 and the cap 64 to define an expansible chamber 102. A rectangular elastomeric gasket 104 is fixed to the piston 84 and engages the inner periphery of the tube portion 46. The gasket 104 inhibits fluid flow between the piston 84 and the surfaces defining the tube portion 46 of the housing 42.

The piston 84 and gasket 104 also cooperate with the tube portion 46 of the housing 42 to define a contractible chamber 105 on a side of the piston opposite the expansible chamber 102. A vent opening 107 is provided in the tube portion 46 of the housing 42. The vent opening 107 places the contractible chamber 105 in fluid communication with the environment external to the housing 42. Such fluid communication assures that fluid damping does not occur due to compression of fluid in the chamber 105 during movement of the piston 84 relative to the housing 42 when the chamber 102 expands.

In the event of a vehicle collision at or above a predetermined threshold level, the seat belt pretensioner is actuated. An electrical signal is communicated over wires 106 to the igniter. The igniter 66 is actuated and ignites the body 12 of gas generating material. The body 12 of gas generating material produces combustion products, which rupture the end wall 74 of the casing 67 and flow from the gas generator 66 into the chamber 102 in the enlarged end portion 48 of the housing 42. The pressure of the combustion products in the chamber 102 applies a force to surfaces of the piston 84, tube portion 46 of the housing 42, enlarged end portion 48 of the housing, and cap 64, all of which define the chamber.

The force expands the chamber 102 by moving the housing 42, the cap 64 and the igniter 66 linearly to the left, as viewed in FIGS. 7–9, relative to the piston 84, the cable 82 and the anchor 80 and in a direction along axis A of the buckle 26. The chamber 105 contracts concurrently with expansion of the chamber 102. Fluid in the chamber 105 escapes through the vent opening 107 in the housing 42 upon contraction of the chamber when the piston 84 moves within the housing. Movement of the housing 42 to the left pulls the connector 44 and the buckle 26 in a direction towards the anchor 80 to tension the seat belt and tighten the seat belt against the occupant. The buckle 26 moves closer to the anchor 80 in a direction along the axis B of the housing 42, from the distance D1 (FIG. 7) to the distance D2 (FIG. 8).

The piston 84 has a pair of recesses 122 formed in opposite sides of the piston. Each recess 122 has a planar surface that extends at a relatively small angle relative to the axis B of the housing 42. A roller 124 and a resilient biasing gasket 126 are located in each recess 122. The rollers 124 and recesses 122 act on the tube portion 46 of the housing 42 to inhibit contraction of the chamber 102 but not expansion of the chamber.

When the chamber 102 expands, the housing 42 moves to the left relative to the piston 84, as viewed in FIGS. 7–9. The rollers 124 are forced against and compress the gaskets 126 by friction of opposite walls of the tube portion 46 of the housing moving relative to the piston 84. When the tube portion 46 of the housing 42 stops moving relative to the piston 84, the resiliency of the biasing gaskets 126 urges the rollers 124 outward relative to the axis B along the planar surfaces defining the recesses 122. The rollers 124 wedge between the opposite walls of the tube portion 46 and the planar surface surfaces of the recesses 122 of the piston 84. The rollers 124 thus inhibit the housing 42 from moving to the right relative to the piston 84, as viewed in FIGS. 7–9, and thus inhibit contraction of the chamber 102.

A kerfed body 12 of polyvinyl chloride (PVC) based gas generating material is particularly useful for a seat belt pretensioner. A polyvinyl chloride (PVC) based gas generating material has rapid burn characteristics that broadly meet the requirements of a seat belt pretensioner. At least one kerf 18 in the body 12 of gas generating material results in the seat belt being more quickly tightened about a vehicle occupant following activation of a crash sensor. By using more or fewer kerfs, the mass generation rate of gas can be tailored to a specific application. A polyvinyl chloride (PVC) based gas generating material has mechanical properties, namely elasticity and tensile strength, which make it easy to provide more or fewer kerfs. The polyvinyl chloride (PVC) based gas generating material is easily cut with a piano wire without loss of material or fracturing the body of gas generating material. After making the cut, the cut is closed so that the amount of gas generating material per unit volume remains constant. In the prior art, kerfs in a body of gas generating material have been in the form of cut-outs. Thus, gas generating material is removed while the volume effectively occupied by the gas generating material remains constant. Increasing the number of cut-outs effectively reduced the amount of gas generating material per unit volume occupied by the material.

EXAMPLE 1

This example illustrates the preparation of a body 12 of gas generating material in accordance with an embodiment of the present invention. 7.13 grams of particulate plastisol grade polyvinyl chloride (PVC) and 8.89 grams of fluid dioctyl adipate (DOA) are added to a conventional mixing device. The polyvinyl chloride (PVC) and dioctyl adipate (DOA) are blended until the particles of polyvinyl chloride (PVC) form a plastisol with the dioctyl adipate (DOA). 5.42 grams of particulate potassium carbonate ($K_2CO_3$), 44.06 grams of particulate sodium nitrate ($NaNO_3$), and 34.16 grams of particulate ammonium perchlorate ($NH_4ClO_4$) are then added to and blended with the plastisol of polyvinyl chloride (PVC) and dioctyl adipate (DOA) until a viscous slurry is formed.

The viscous slurry is poured into a heated-jacket worm extruder. The viscous slurry is heated as it passes through the extruder and forms a thermoplastic gel (plasticized polyvinyl chloride) containing the particulate potassium carbonate ($K_2CO_3$), sodium nitrate ($NaNO_3$), and ammonium perchlorate ($NH_4ClO_4$).

The thermoplastic gel is passed through a die and mandrel so that a rod of extrudate is formed having an axially extending opening. The rod has an outer diameter of about 9 mm and an inner diameter of about 3 mm. After leaving the die, the rod of extrudate is cooled to a rigid gel state.

The cooled rod of extrudate is positioned on a conveying means so that the cooled rod is advanced in the direction of its longitudinal axis by the conveying means. The conveying means advances the cooled rod of extrudate into a cutting unit. The cutting unit comprises a piano wire positioned transverse to the longitudinal axis of the rod of extrudate. The piano wire has a thickness of about 0.01 inches.

The piano wire is drawn in a radial direction partially through (about 7 mm) the longitudinal axis of the cooled rod of extrudate. A kerf is formed in the cooled rod of extrudate upon removal of the piano wire. The kerfed rod of extrudate is advanced by the conveying means and then cut to desired length (about 50 mm) by drawing the piano wire completely through the kerfed rod of extrudate. The kerf is about midway between the ends of the cut body.

The body of gas generating material so formed has a weight of about 5.95 grams and comprises an elastic matrix of plasticized polyvinyl chloride with finely divided particulate potassium carbonate ($K_2CO_3$), sodium nitrate ($NaNO_3$), and ammonium perchlorate ($NH_4ClO_4$) dispersed in the matrix. The elasticity of the body of gas generating material is such that the kerf is in an essentially closed configuration.

EXAMPLE 2

This example illustrates the increase in mass generation of gas per unit of time as the number of kerfs in the body of gas generating material is increased.

Six bodies of gas generating material were prepared, as in Example 1, comprising by weight 7.13% polyvinyl chloride (PVC), 8.89% dioctyl adipate (DOA), 5.42% potassium carbonate ($K_2CO_3$), 44.06% sodium nitrate ($NaNO_3$), and 34.16% ammonium perchlorate ($NH_4ClO_4$). Each of the bodies of gas generating material had a weight of about 5.95 grams, an outer diameter of about 9 mm, an inner diameter of about 3 mm, and a length of 50 mm. The bodies of gas generating material were kerfed as in Example 1. The number of kerfs in each of the bodies of gas generating was varied as shown in Table 1.

TABLE 1

| Body | 1 | 2 | 3 | 4 | 5 | 6 |
|---|---|---|---|---|---|---|
| # of kerfs | 0 | 4 | 9 | 24 | 49 | 99 |
| distance between kerfs (mm) | 0 | 10 | 5 | 2 | 1 | 0.5 |

The mass generation rate of gas per unit of time (liters/seconds) was calculated for bodies 1–6 and plotted in FIG. 9. The calculations were performed using a burn rate of 49 mm/sec at 5,000 psi, which is the burn rate of an unkerfed body of gas generating material comprising by weight 7.13% polyvinyl chloride (PVC), 8.89% dioctyl adipate (DOA), 5.42% potassium carbonate ($K_2CO_3$), 44.06% sodium nitrate ($NaNO_3$), and 34.16% ammonium perchlorate ($NH_4ClO_4$).

FIG. 9 is a graph showing the volume of gas produced against seconds in the combustion of bodies (1–6) of gas generating material. As can be seen in FIG. 9, as the number of kerfs in the body of gas generating material increases, the mass generation rate of gas per unit of time increases. At a time of about 0.002 seconds after combustion of the bodies of gas generating material, the body 1 (no kerfs) had evolved less than about 0.1 liters of gas, whereas body 6 had evolved more than 1.6 liters of gas.

Advantages of a body of gas generating material comprising a plasticized thermoplastic polyvinyl fuel, kerfed using a piano wire, should now be apparent. The kerf in the body of gas generating material increases the mass generation rate of gas per unit of time during combustion of the body of gas generating material even though the kerf is essentially closed. Moreover, the number of kerfs in the body of gas generating material can be varied to tailor the mass generation rate per unit of time of the body of gas generating material.

From the above description of the invention, those skilled in the art will perceive improvements, changes and modifications. Such improvements, changes and modifications within the skill of the art are intended to be covered by the appended claims.

Having described the invention the following is claimed:

1. A body of gas generating material for use in a gas generator producing upon ignition combustion products, said body of gas generating material comprising an elastic matrix, an outer periphery, and at least one kerf extending from the outer periphery partially through the body of gas generating material, said kerf having an essentially closed configuration.

2. The body of gas generating material of claim 1 wherein said kerf is a piano wire cut.

3. The body of gas generating material of claim 1 wherein said elastic matrix is a plasticized thermoplastic polymer fuel and said gas generating material comprises a finely divided particulate oxidizer dispersed within said matrix.

4. The body of gas generating material of claim 1, wherein the kerf is made by drawing a piano wire partially through the body of gas generating material.

5. The body of gas generating material claim 4 wherein said kerf is made without loss of gas generating material.

6. The body of gas generating material of claim 1, wherein said body of gas generating material has a longitudinal axis, said kerf extending transverse to said axis and centered about a straight line extending from a point on the said outer periphery to a point past said longitudinal axis.

7. The body of gas generating material of claim 6, wherein said kerf intersects said outer periphery over more than 180 degrees about said longitudinal axis.

8. The body of gas generating material of claim 1 comprising at least two kerfs which are spaced apart longitudinally along said axis in a non-intersecting relationship and extend from points on the periphery of the body of gas generating material that are on opposite sides of said axis.

9. The body of gas generating material of claim 1 comprising at least two kerfs which are spaced apart longitudinally along said axis in a non-intersecting relationship and extend from points on the outer periphery on the same side of the body of gas generating material.

10. The body of gas generating material of claim 1, wherein the body of gas generating material comprises a matrix forming amount of polyvinyl chloride, a plasticizing amount of plasticizer, and an oxidizing amount of an oxidizer.

11. A method of making a body of gas generating for use in a gas generator comprising:

providing a body gas generating material which upon ignition produces combustion products, said body of gas generating material having and elastic matrix and an outer periphery; and drawing a piano wire partially through the body of gas generating material, so that a kerf is formed with an essentially closed configuration.

12. The method of claim 11 wherein the body of generating material is provided by extruding the body of gas generating material.

13. The method of claim 11 wherein the drawing of the piano wire partially through the body of gas generating causes essentially no reduction in the mass of the body of gas generating material.

14. The method of claim 11 wherein the body of gas generating material comprises a matrix of a thermoplastic polymer fuel and finely divided particulate oxidizer dispersed in said matrix.

15. The method of claim 1, wherein said body of gas generating material has a longitudinal axis, said kerf extending transverse to said axis and centered about a straight line extending from a point on the said outer periphery to a point past said longitudinal axis.

16. The method of claim 11, wherein the piano wire is successively drawn through the body of gas generating material so as to form at least two kerfs which are spaced apart longitudinally along said axis in a non-intersecting relationship and which extend from points on the periphery of the body of gas generating material that are on opposite sides of said axis.

17. The method of claim 11, wherein the piano wire is successively drawn through the body of gas generating material so as to form at least two kerfs which are spaced apart longitudinally along said axis in a non-intersecting relationship and which extend from points on the outer periphery on the same side of the body of gas generating material.

18. A seat belt pretensioner comprising:

a gas generator defining a combustion chamber and a body of gas generating material in the combustion chamber which upon combustion produces a gas that actuates the seat belt pretensioner, said body of gas generating material comprising an elastic matrix, an outer periphery, and at least one kerf extending from the outer periphery partially through the body of gas generating material, said kerf having an essentially closed configuration.

19. The seat belt pretensioner of claim 18 wherein said kerf is a piano wire cut.

20. The seat belt pretensioner of claim 18 wherein said elastic matrix is a plasticized thermoplastic polymer fuel and said gas generating material comprises a finely divided particulate oxidizer dispersed within said matrix.

21. The seat belt pretensioner of claim 18 wherein said body of gas generating material is extruded or molded.

22. The seat belt pretensioner of claim 18 wherein said kerf is made by drawing a piano wire partially through the body of gas generating material.

23. The seat belt pretensioner of claim 22 wherein said kerf is made without loss of gas generating material.

24. The seat belt pretensioner of claim 18 comprising at least two kerfs which are spaced apart longitudinally along said axis in a non-intersecting relationship and extend from points on the periphery of the body of gas generating material that are on opposite sides of said axis.

25. The seat belt pretensioner of claim 18 comprising at least two kerfs which are spaced apart longitudinally along said axis in a non-intersecting relationship and extend from points on the outer periphery on the same side of the body of gas generating material.

26. The seat belt pretensioner of claim 18, wherein the body of gas generating material comprises a matrix forming amount of polyvinyl chloride, a plasticizing amount of plasticizer, and an oxidizing amount of an oxidizer.

* * * * *